United States Patent
Bastide et al.

(10) Patent No.: US 10,958,614 B2
(45) Date of Patent: Mar. 23, 2021

(54) CO-REFERENCES FOR MESSAGES TO AVOID CONFUSION IN SOCIAL NETWORKING SYSTEMS

(71) Applicant: International Business Machines Corporation, Armonk, NY (US)

(72) Inventors: Paul R. Bastide, Boxford, MA (US); Melissa A. Lord, Raymond, NH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 745 days.

(21) Appl. No.: 15/165,057

(22) Filed: May 26, 2016

(65) Prior Publication Data

US 2017/0346779 A1 Nov. 30, 2017

(51) Int. Cl.
*H04L 12/58* (2006.01)
*H04L 29/08* (2006.01)

(52) U.S. Cl.
CPC .............. *H04L 51/32* (2013.01); *H04L 51/16* (2013.01); *H04L 67/22* (2013.01)

(58) Field of Classification Search
CPC .... G06F 17/30976; H04L 51/32; H04L 67/22
See application file for complete search history.

(56) References Cited

U.S. PATENT DOCUMENTS

| | | | | |
|---|---|---|---|---|
| 7,814,152 B2* | 10/2010 | McGowan | ........... | G06Q 10/107 340/573.1 |
| 9,065,925 B2* | 6/2015 | Ferguson | ............ | H04M 1/7255 |
| 9,191,788 B2* | 11/2015 | Somekh | ................... | H04W 4/12 |
| 9,596,195 B1* | 3/2017 | Sheinberg | .......... | G06Q 30/0277 |
| 9,678,948 B2* | 6/2017 | Bhatt | ...................... | G06F 40/30 |
| 9,853,924 B2* | 12/2017 | Clark | .................... | H04L 51/046 |
| 10,567,312 B2* | 2/2020 | Goldberg | .............. | H04L 67/306 |
| 2004/0162724 A1* | 8/2004 | Hill | ...................... | G10L 15/1822 704/231 |
| 2005/0262199 A1* | 11/2005 | Chen | .................... | G06Q 10/107 709/204 |
| 2008/0270518 A1* | 10/2008 | McGowan | ........... | G06Q 10/107 709/202 |
| 2009/0171937 A1* | 7/2009 | Chen | .................... | G06Q 10/107 |
| 2009/0215479 A1* | 8/2009 | Karmarkar | .............. | H04L 67/18 455/466 |
| 2012/0005221 A1* | 1/2012 | Ickman | ............. | G06F 17/30528 707/769 |

(Continued)

OTHER PUBLICATIONS

Chen, W. et al., "The Evaluative Criteria of Computer-Based Vocabulary Learning Games," In Edutainment Technologies, Educational Games and Virtual Reality/Augmented Reality Applications, vol. 6872, Lecture Notes in Computer Science, pp. 240-244.

(Continued)

*Primary Examiner* — Jimmy H Tran
(74) *Attorney, Agent, or Firm* — Cuenot, Forsythe & Kim, LLC (57) ABSTRACT

Clarifying communications includes receiving, using a processor, a first message from a sending device directed to a user device, determining, using the processor, a second message correlated with the first message, generating, using the processor, a co-reference from the second message, and providing, using the processor, the first message in association with the co-reference to the user device.

20 Claims, 5 Drawing Sheets

(56) References Cited

U.S. PATENT DOCUMENTS

| | | | |
|---|---|---|---|
| 2012/0124148 A1* | 5/2012 | Hamlin | H04L 51/36 709/206 |
| 2012/0239761 A1* | 9/2012 | Linner | G06F 17/2765 709/206 |
| 2012/0240062 A1 | 9/2012 | Passmore et al. | |
| 2012/0270578 A1* | 10/2012 | Feghali | H04L 51/10 455/466 |
| 2013/0218877 A1* | 8/2013 | Satyanarayanan | H04L 51/04 707/723 |
| 2013/0254231 A1 | 9/2013 | Decker et al. | |
| 2013/0304452 A1 | 11/2013 | O'Sullivan et al. | |
| 2013/0346067 A1* | 12/2013 | Bhatt | G06F 40/30 704/9 |
| 2014/0047385 A1 | 2/2014 | Ruble et al. | |
| 2014/0082106 A1* | 3/2014 | Scherpa | H04L 12/1831 709/206 |
| 2014/0171133 A1* | 6/2014 | Stuttle | G06F 17/3087 455/466 |
| 2015/0032825 A1* | 1/2015 | Bastide | H04L 51/34 709/206 |
| 2015/0057035 A1* | 2/2015 | Somekh | H04L 51/14 455/466 |
| 2015/0222576 A1* | 8/2015 | Anderson | G06F 1/16 715/752 |
| 2015/0341291 A1* | 11/2015 | Rideout | H04L 12/1818 715/758 |
| 2016/0087925 A1* | 3/2016 | Kalavagattu | H04L 43/10 709/206 |
| 2016/0156574 A1* | 6/2016 | Hum | G06Q 10/10 715/752 |
| 2016/0171538 A1* | 6/2016 | Balasubramanian | G06F 16/335 705/14.53 |
| 2016/0285816 A1* | 9/2016 | Schmid | H04L 67/306 |
| 2016/0301639 A1* | 10/2016 | Liu | G06Q 50/01 |
| 2016/0330147 A1* | 11/2016 | Antebi | H04L 51/04 |
| 2016/0359777 A1* | 12/2016 | Tucker | H04L 51/16 |
| 2016/0379314 A1* | 12/2016 | Trudeau | G06Q 50/01 705/319 |
| 2017/0272388 A1* | 9/2017 | Bern | H04L 51/12 |
| 2018/0054466 A1* | 2/2018 | Blattner | H04L 12/1822 |
| 2019/0108207 A1* | 4/2019 | Upadhyay | G06F 40/166 |

OTHER PUBLICATIONS

IBM, "SPSS Text Analytics for Surveys," [online] IBM Corporation, retrieved Mar. 17, 2016, retrieved from the Internet: <http://www-03.ibm.com/software/products/en/spss-text-analytics-surveys, 2 pg.

IBM, "SPSS Statistics," [online] IBM Corporation, retrieved Mar. 17, 2016, retrieved from the Internet:<http://www-01.ibm.com/software/analytics/spss/products/statistics/>, 2 pg.

IBM, "A System and Method for Ensuring that Important Electronic Messages are Read and Sufficiently Processed—Leveraging Trust Relationships in Social Networks," [online] IP.com Prior Art Database Technical Disclosure Bulletin, Jan. 21, 2009, Article No. IPCOM000178265D, 3 pg.

Anonymous, "Method and System for Automatic Clarification of Negative Influence in Social Networking Site," [online] IP.com Prior Art Database Technical Disclosure Bulletin, Jun. 15, 2015, Article No. IPCOM000242022D, 3 pg.

Kiddon, C. et al., "That's What She Said: Double Entendre Identification," In Proc. of 49th Annual Meeting of the Assoc. for Computational Linguistics: Human Language Technologies, Jun. 2011, pp. 89-94.

Mell, P. et al., "The NIST Definition of Cloud Computing," National Institute of Standards and Technology, US Dept. of Commerce, Special Publication 800-145, Sep. 2011, 7 pg.

"Natural Language Processing," [online] Wikipedia, the free encyclopedia, May 20, 2016, [retrieved May 25, 2016] retrieved from the Internet: <https://en.wikipedia.org/wiki/Natural_language_processing>.

Zhang, L., "Exploitation in Context-Sensitive Affect Sensing from Improvisational Interaction," In Proc. of 6th Int'l. Conf. on E-Learining and Games, Edutainment Technologies, pp. 263-263.

* cited by examiner

CO-REFERENCES FOR MESSAGES TO AVOID CONFUSION IN SOCIAL NETWORKING SYSTEMS

BACKGROUND

This disclosure relates to improving clarity of communications exchanged using a social networking system. A social networking system connects users in logical and organized ways. This connectivity facilitates the sharing and processing of information between the users of the social networking system. Often, however, users post brief messages that lack context or a point of reference. This brevity obscures the meaning of the messages and leads to ambiguity and/or confusion on the part of the recipients. Recipients can spend significant time attempting to infer context and/or intended meaning. In many cases, the original point of the message is lost or goes unacknowledged by the recipient.

SUMMARY

An embodiment of the present invention includes a method of clarifying communications. The method may include receiving, using a processor, a first message from a sending device directed to a user device, determining, using the processor, a second message correlated with the first message, and generating, using the processor, a co-reference from the second message. The method may also include providing, using the processor, the first message in association with the co-reference to the user device.

Another embodiment of the present invention may include a system. The system includes a processor programmed to initiate executable operations for clarifying communications. The executable operations can include receiving a first message from a sending device directed to a user device, determining a second message correlated with the first message, and generating a co-reference from the second message. The executable operations may also include providing the first message in association with the co-reference to the user device.

Another embodiment of the present invention includes a computer program product including a computer readable storage medium having program code stored thereon. The program code is executable by a processor to perform a method of clarifying communications. The method can include receiving, using the processor, a first message from a sending device directed to a user device, determining, using the processor, a second message correlated with the first message, and generating, using the processor, a co-reference from the second message. The method can also include providing, using the processor, the first message in association with the co-reference to the user device.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to social networking systems and, more particularly, to improving clarity of communications exchanged using a social networking system. Example embodiments described within this disclosure generate a co-reference for a selected message. The co-reference may be provided with the selected message to provide context and clarity for the selected message. A target of the selected message may receive both the message and the co-reference. The co-reference is generated from one or more other messages or portion(s) thereof determined to be correlated with the selected message. In one example, the messages correlated with the selected message are determined using natural language processing (NLP). It should be appreciated, however, that other text and/or language processing techniques may be used and that the examples described within this disclosure are not intended to be limiting. Example embodiments are described in greater detail below with reference to the figures.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
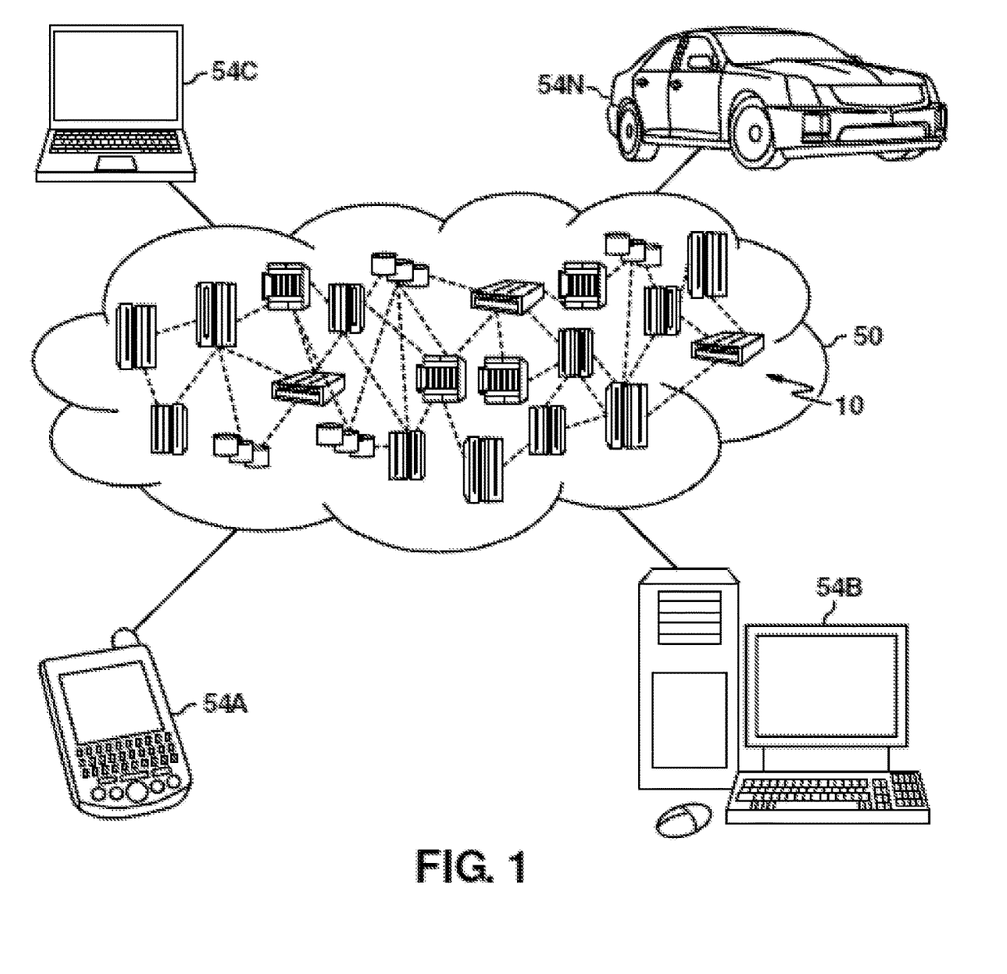
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
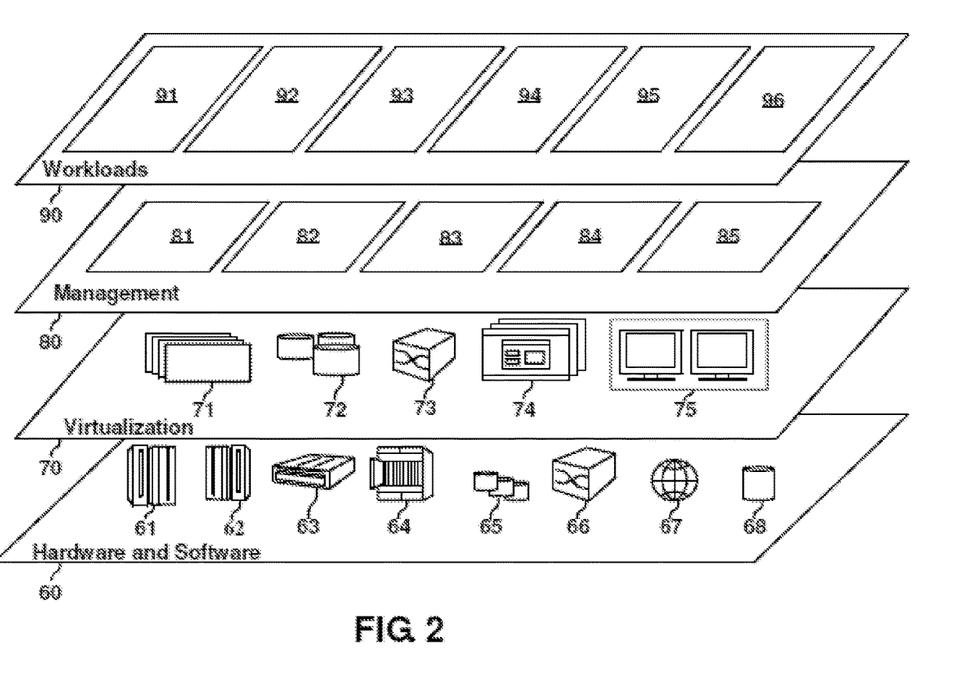
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and social networking and processing 96.

Execution of social networking and processing 96 implements a social networking system. As defined herein, a "social networking system" is a computing platform that allows users to build social networks or social relations among people who share similar interests, activities, backgrounds or real-life connections. Through a social networking system, users may send communications through different mechanisms such as by posting messages or other media, commenting on messages, posts, or other media, replying to messages, and performing other operations such as "liking" a communication or item of media, sharing the communication or item of media, expressing an emotional sentiment, and so forth. In the context of a social networking system, actions such as posting, replying, liking, sharing, expressing sentiment, and so forth are programmatic actions that are monitored and persisted within social the networking system, e.g., within a data storage device in a data structure within and/or accessible by, the social networking system.

In one embodiment, the social networking system is an asymmetric follow system. An asymmetric follow system is one where many users (e.g., accounts) may follow an account without that account having to follow the other accounts or users back or in return. A social networking system that is an asymmetric follow system implements one-way relationships. In another embodiment, the social networking system is a symmetric system. A symmetric system is one where a first user adds a second, different user as a "friend" thereby establishing a relationship or association between the two users. In a symmetric system, when the first user adds the second user as a "friend," the second user must add the first user as a friend back or in return. A symmetric system implements two-way relationships.

Social networking systems typically include one or more messaging platforms for exchanging messages and/or communicating. In some cases, the messaging platform constitutes the social networking system. Examples of messaging platforms within social networking systems or that may form social networking systems include, but are not limited to, inboxes, forums, groups, walls, activity streams, timelines, profiles, news feeds, Voice-over-Internet-Protocol (VoIP), software phones, instant messaging (IM), short message service (SMS), blog(s), Website(s), and so forth.

Figure 3:
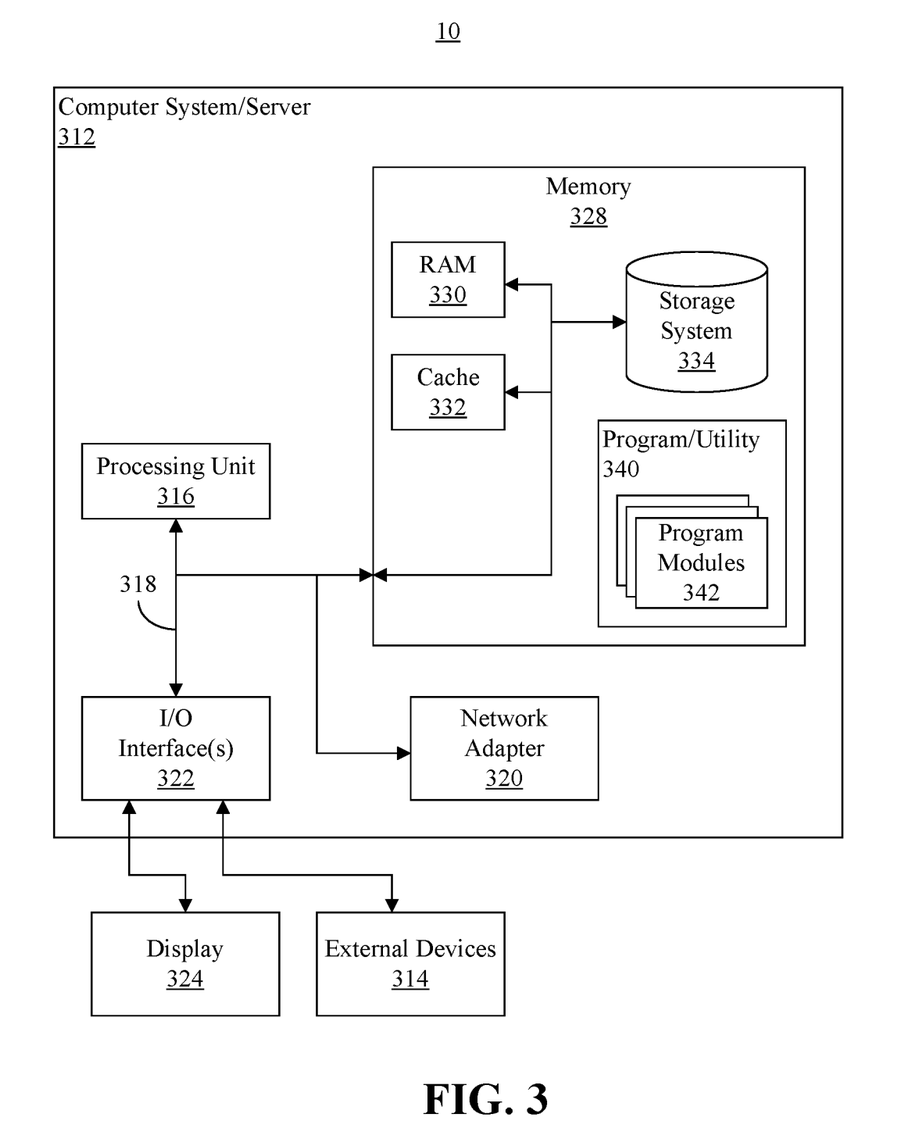
FIG. 3 depicts a cloud computing node according to an embodiment of the present invention.

Referring now to FIG. 3, a schematic of an example of a cloud computing node 10 is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 312, which is operational with numerous other general purpose or special purpose computing system environments or configurations. Examples of well-known computing systems, environments, and/or configurations that may be suitable for use with computer system/server 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 312 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 312 in cloud computing node 10 is shown in the form of a general-purpose computing device. The components of computer system/server 312 may include, but are not limited to, one or more processors or processing units 316, a system memory 328, and a bus 318 that couples various system components including system memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 312 typically includes a variety of computer system readable media. Such media may be any available media that is accessible by computer system/server 312, and it includes both volatile and non-volatile media, removable and non-removable media.

System memory 328 can include computer system readable media in the form of volatile memory, such as random access memory (RAM) 330 and/or cache memory 332. Computer system/server 312 may further include other removable/non-removable, volatile/non-volatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein.

Computer system/server 312 may also communicate with one or more external devices 314 such as a keyboard, a pointing device, a display 324, etc.; one or more devices that enable a user to interact with computer system/server 312; and/or any devices (e.g., network card, modem, etc.) that enable computer system/server 312 to communicate with one or more other computing devices. Such communication can occur via Input/Output (I/O) interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems, etc.

Figure 4:
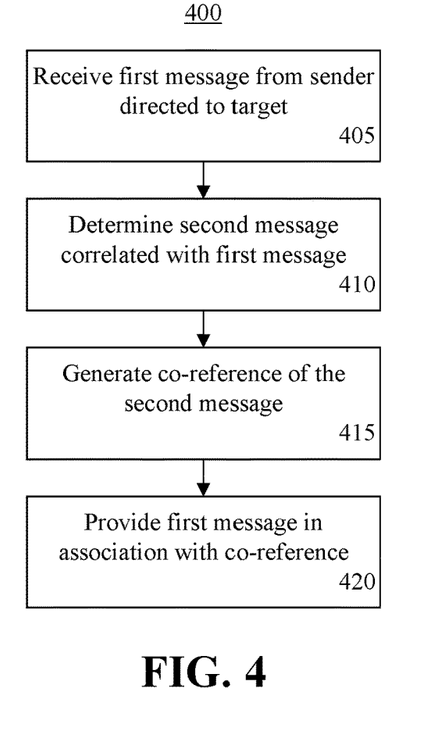
FIG. 4 depicts a method of co-reference processing using a social networking system according to an embodiment of the present invention.

FIG. 4 depicts a method 400 of co-reference processing using a social networking system according to an embodiment of the present invention. Method 400 may be used to clarify communications within the social networking system. In one aspect, a data processing system such as the cloud computing node 10 of FIG. 3 or another computer system performs method 400. A data processing system is capable of executing social networking and processing 96 thereby implementing a social networking system (system) to perform the operations of method 400.

Method 400 can begin in block 405 where the system receives a first message. The first message is from a sender and directed to a target. The sender is a user that is a member of the system. The sender, for example, may compose the first message using a sending device. The target belongs to the system. The term "target," as used herein in reference to a message, means a recipient to which the message is directed, a channel to which the message is directed or published, or both. A message may be directed to a recipient, which is a user that is a member of the system, without a particular channel being specified. A message may be directed to a particular channel without a particular recipient being specified.

In block 410, the system determines a second message correlated with the first message. The system is capable of determining the second message from a set of messages by comparing the first message, or attributes of the first message, with the messages of the set. For example, the system is capable of comparing attributes of the first message, text of the first message, etc. to messages of a set of messages. In one example, the system is capable of determining the set of messages compared with the first message based upon relationship(s) of the sender and/or target of the first message with the sender(s) and/or target(s) of messages within the system. The system creates a set of messages that includes messages of the system that meet the criteria. The system selects or determines the second message from among the messages in the set from the comparison.

In one example embodiment, the system performs text processing on the first message and compares the text of the first message with text of the messages of the set to determine one or more message from the set with matching terms. In another example embodiment, the system performs natural language processing on the first message and the set of messages to determine the second message from the set. The system may determine, for example, that the first message includes an ambiguity and that one or more messages from the set of message resolve the ambiguity. The system selects the message(s) that resolve the ambiguity as the second message.

Natural language processing or "NLP" is a field of computer science, artificial intelligence and linguistics which implements computer processes to facilitate interactions between computer systems and human (natural) languages. NLP enables computers to derive computer-understandable meaning from natural language input. The International Organization for Standardization (ISO) publishes standards for NLP. One example standard for NLP is ISO/TC37/SC4. As part of NLP, a system may also be capable of performing semantic analysis. Semantic analysis may follow parsing and involve extraction of context-independent aspects of a sentence's meaning, including entities, named entities, the semantic roles of entities mentioned in the sentence, and quantification information, such as cardinality, iteration, and dependency.

In block 415, the system generates a co-reference for the second message. Example implementations of the co-reference include, but are not limited to, a screen shot of the second message, metadata of the second message, a portion of the second message, e.g., text or a portion of the text of the second message, video, audio, etc.

In block 420, the system provides the first message in association with the co-reference. The system is capable of providing the first message in association with the co-reference to a device of a recipient or a user of the system (hereafter collectively referred to as "user device"). As defined herein, "providing" a message and a co-reference means that the system makes the first message and the co-reference available to a device of a user for access or delivers the first message and the co-reference to a device of a user. The user may be a recipient or a user that is subscribed to a channel to which the message and co-reference are provided. In one aspect, the co-reference is positioned proximate to the first message as displayed to indicate that the co-reference is related to and/or part of the first message. For example, the system is capable of causing the co-reference to be displayed adjacent to, immediately below, immediately above, immediately to the left or right, etc. of the first message.

Accordingly, as the recipient views or otherwise consumes the first message, the recipient also views the co-reference. The co-reference provides supplemental information that further clarifies the first message, provides additional context to the first message, a point of reference for the first message, or resolves an ambiguity of the first message.

Figure 5:
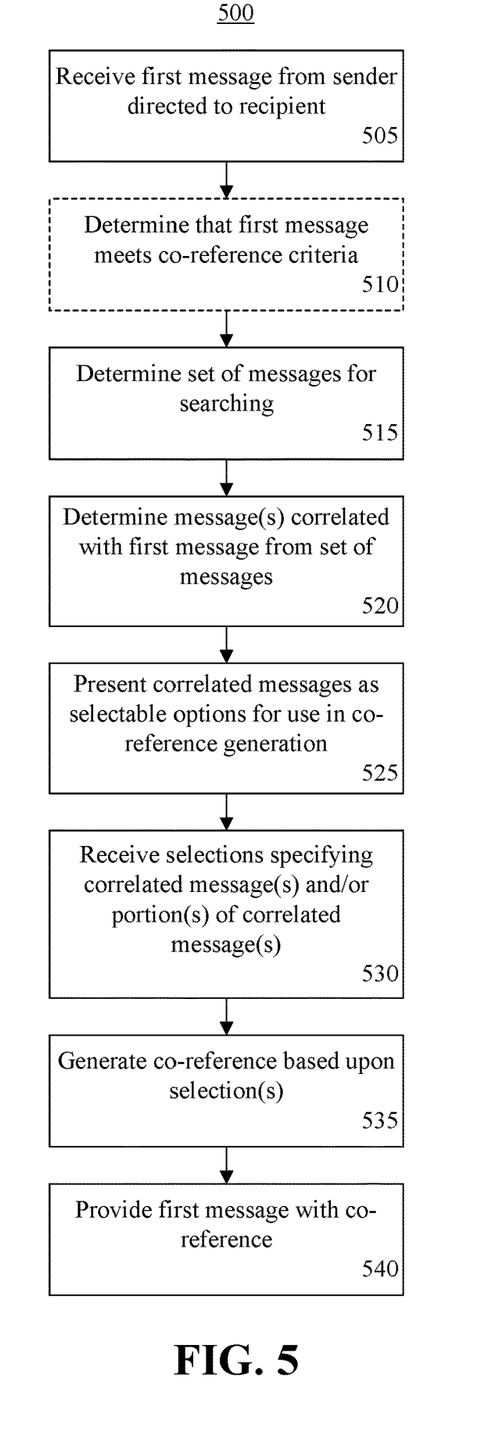
FIG. 5 depicts another method of co-reference processing using a social networking system according to an embodiment of the present invention.

FIG. 5 depicts another method 500 of co-reference processing using a social networking system according to an embodiment of the present invention. Method 500 may be used to clarify communications in a social networking system. Method 500 is performed by a system as described herein with reference to FIGS. 1-3 or another computer system.

In block 505, the system receives a first message from the sender. The message is directed to a target. As noted, the message may be directed to a particular communication channel and/or a particular recipient. The sender, for example, composes the first message using a sending device. The sending device may be a computer, a mobile device, or other communication device that is communicatively linked with the social networking system.

In block 510, the system determines that the first message meets co-reference criteria. As defined herein, the term "co-reference criteria" is one or more particular attributes of a message that, when detected, cause the system to perform co-reference processing. In one embodiment, the system is capable of selectively applying co-reference processing to messages. The system is capable of comparing the first message with the co-reference criteria. Responsive to determining that the first message meets the co-reference criteria, the system implements co-reference processing as described herein with reference to FIG. 3 and/or FIG. 4. Responsive to determining that the first message does not meet the co-reference criteria, the system is capable of discontinuing further co-reference processing and may provide the first message to the target.

In one embodiment, the co-reference criteria include the recipient, or the recipients, of the message. For example, the first message may be directed to one or more particular recipients. In the system, messages may be directed to particular users whether via a "To" field, a "CC" field, a "BC" field, using an "@" designator followed by text or other symbols indicating a user or user account, or another mechanism for designating recipients of messages depending upon the particular type of messaging platform utilized by the system (e.g., electronic mail, instant messaging, forum, inbox, etc.).

In another embodiment, the co-reference criteria include a communication channel. A communication channel refers to a subject or particular source of content to which users may subscribe. A message directed to a communication channel is provided to the users that subscribe to the communication channel as opposed to being provided to particular, enumerated users. The users that receive the first message are the users that have subscribed to the communication channel specified for the message at the time the message is generated and/or provided. For example, the system may use a "#" designator followed by other identifying text or symbols to specify the communication channel of the first message.

It should be appreciated that co-reference criteria can be only recipient(s), only communication channel(s), or both recipient(s) and communication channel(s). For purposes of illustration, the system, in block 510, compares one or more attributes of the message such as the target(s) to which the message is directed with the co-reference criteria. Responsive to determining a match between the attribute(s) (e.g., targets) and the co-reference criteria, the system continues with co-reference processing for the first message. Otherwise, the system may skip further co-reference processing and provide the first message to the target.

Proceeding with block 515, the system determines a set of messages to be searched for messages correlated with the first message. The set of messages is a subset of the messages included in the system. In one embodiment, the system determines the set of messages based upon the relationship of the sender and/or target (e.g., recipient and/or communication channel) of the messages with the sender and/or target of the first message. For example, the system determines the set of messages based upon the relationship of the sender of the messages with the sender of the first message, the target of the messages with the sender of the first message, the sender of the messages with the target of the first message, and/or the target of the first message with the target of the first message.

In one example embodiment, the system determines the set of messages as the messages that have been sent by the sender of the first message and/or received by the sender of the first message. The system, for example, is capable of filtering messages within the system to determine the set of messages.

In another example embodiment, the system determines the set of messages as messages sent and/or received by the sender, friends of the sender, etc. The system may determine that the set of messages includes messages sent and/or received by the sender, friends of the sender, friends of friends of the sender, on to a particular degree of separation that may be specified as a configuration parameter within the system.

In another example embodiment, the system determines the set of messages to include messages from sources and/or channels that are publicly available. In one aspect, the sender and/or recipient are subscribed to the source and/or channel. In another aspect, the sender and/or recipient are not subscribed to the source and/or channel. For example, the system may include messages posted by a public channel or account relating to upcoming events. These message may be included in the set along with other messages using one or more or all of the other set creation techniques described herein.

In block 520, the system determines one or more messages correlated with the first message from the set of messages. In one embodiment, the system compares text from a body of the first message with text of the body of messages in the set of messages. The system is capable of determining that a message of the set of messages is correlated with the first message when matching terms, phrases, symbols, or other content are found.

In another embodiment, the system is capable of performing NLP between the first message and the set of messages. The system determines that message(s) of the set of messages are correlated with the first message responsive to NLP determining that two messages discuss a same subject, a same object, have same or similar meaning, reference same entities, are dependent, etc. In another example, the system may use NLP to determine that the first message includes an ambiguity that is resolved by a second message found within the set.

In block 525, the system presents the correlated messages as selectable options for use in co-reference generation. The system is capable of providing, e.g., displaying, the messages, or references to the messages, as selectable options. In block 530, the system receives a selection of one or more of the selectable options from the sender and/or the sender device. The selectable options, or the selection that is received, may also specify one message, more than one message, a portion of a message, a portion of more than one message, or a combination of one or more messages and one or more portions of one or more messages.

In block 535, the system generates a co-reference based upon the selection(s) received in block 530. The system is capable of generating a thumbnail, a screen shot, metadata, text or other portion of the selected messages, etc. as the co-reference.

In block 540, the system provides the first message with the co-reference. The system is capable of providing the first message with the co-reference to a target. In the case of e-mail, for example, the system may send the first message with the co-reference embedded therein inline in the body portion of the e-mail. Alternatively, the system may send the first message with the co-reference as an attachment. In the case of an instant (e.g., a text) message, the system may send the first message with the co-reference as additional text or as an image with the first message or as an additional, separate message sent immediately following the first message. In the case of a forum or other message board, the system may post the first message to the target with the co-reference also being posted and located proximate to the first message.

Figure 6:
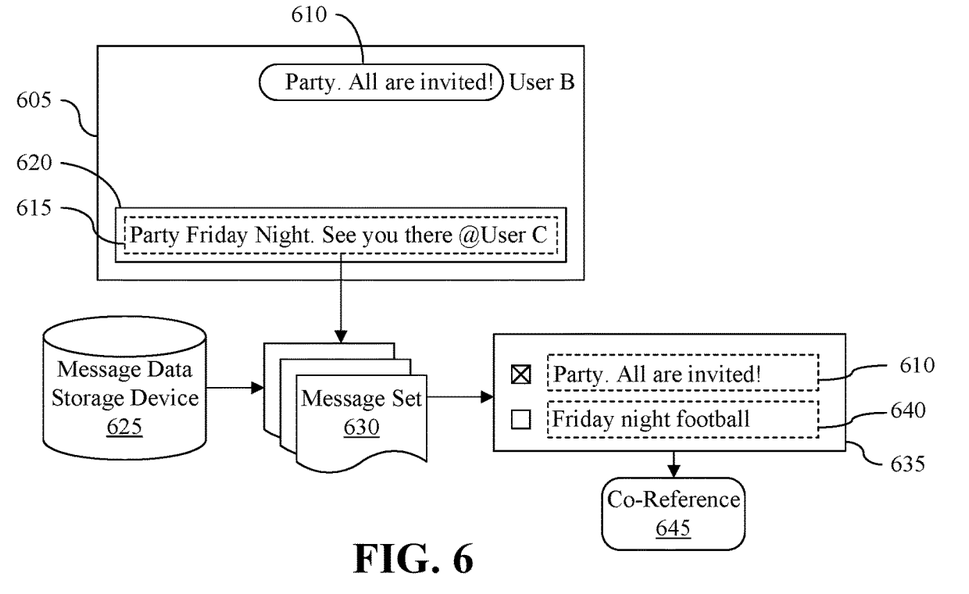
FIG. 6 depicts co-reference generation for a message according to an embodiment of the present invention.

FIG. 6 depicts co-reference generation for a message according to an embodiment of the present invention. FIG. 6 illustrates a window 605. Window 605 is generated as part of a social networking system (system) through which users communicate. Window 605, for example, may be provided by the social networking system and displayed on a user device. For purposes of illustration, the username of the user is "User A." In the example of FIG. 6, another user having username "User B" sends a message 610 to User A. Message 610 is displayed within window 605. In response to receiving message 610 from User B, User A types message 615 into message entry box 620. In this example, message 615 is directed to User C as indicated by the "@" symbol followed by the username "User C."

For purposes of illustration, consider the case where User A and User B have a relationship in that both are friends, e.g., have a two-way relationship. In other words, User A is in User B's network and vice versa. User C is in User A's network. User C, however, is not in User B's network. Alternatively, the person having the party may not be a user of the system at all (e.g., User B is posting a message about another person's party).

The system implements co-reference processing for message 615. In this example, the system is capable of accessing message data storage device 625 to determine message set 630. Message set 630 is a subset of messages from message data storage device 625 determined as described herein, e.g., based upon relationships between users. In one example, message set 630 is the set of messages that have been received and sent by User A. In a further example, the system may limit the set of messages according to the date and/or time the message was sent or received. In this example, message set 630 may include only those messages sent and/or received by User A within the last N units of time (e.g., minutes, hours, days, etc.), where N is an integer that may be adjusted.

The system is capable of comparing message 615 with message set 630 using any of the various processing techniques described herein. The system determines that messages 610 and 640, from message set 630, are correlated with message 615. Accordingly, the system presents a further window or user interface 635 that provides messages 610 and 640 as selectable options. In the example of FIG. 6, the system has determined that message 610 is correlated with message 615 because each includes the text or word "Party." The system has determined that message 640 is correlated with message 615 because each includes the text or word "Friday."

The user, e.g., User A, may provide a user input that is received by the system. The user input may select one or both of messages 610 and 640. In this example, User A has selected message 610. In response to User A selecting message 610 or indicating that selection of correlated messages is complete, the system generates co-reference 645.

In one aspect, the system is capable of detecting ambiguity within message 615. For example, the system, in determining that message 615 is correlated with more than one message, determines that message 615 is ambiguous. In another aspect, for example, the system may determine that message 615 is not ambiguous and discontinue co-reference processing responsive to determining that only one message of the message set is correlated with message 615.

Figure 7:
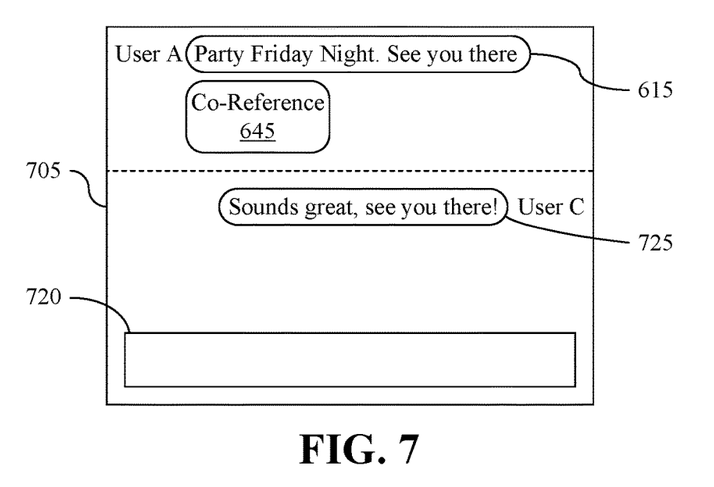
FIG. 7 depicts a message and a co-reference according to an embodiment of the present invention.

FIG. 7 depicts a message and a co-reference according to an embodiment of the present invention. FIG. 7 illustrates an example where the system provides message 615 and co-reference 645. FIG. 7 illustrates a window 705. Window 705 is generated as part of the social networking system (system). Window 705, for example, may be provided by the social networking system and displayed on a user device. For purposes of illustration, the username of the user of the device is "User B."

As pictured, message 615 from User A, which was directed to User B in FIG. 6, is displayed in window 705 with co-reference 645. In this example, User C has responded with message 725. Co-reference 645 may be an image of message 615 (e.g., a thumbnail), text of message 615 visually distinguished from message 615 as presented in window 705. Co-reference 645, however, is displayed proximate to message 615 in window 705. In this example, co-reference 645 is displayed immediately below message 615. The grouping of co-reference 645 with message 615 within the dashed lines indicates that co-reference 645 is for message 615.

It should be appreciated that the system can cause co-reference 645 to be displayed adjacent to message 615 (e.g., above, to the left, to the right, below), abutting message 615 (e.g., where outlines or user interface elements of message 615 and co-reference 645 abut), and so forth to indicate that co-reference 645 provides context and/or explanation for message 615.

In another example, a user may select a portion of a correlated message to be used as co-reference 645. Consider an example where message 610 is a lengthy message including a plurality of lines of text relating to multiple, different subjects. In that case, responsive to a user selection of message 610, the system may provide the user with an opportunity to select a subset of the text from the body of message 610. In one embodiment, the system is capable of generating co-reference 645 using the selected text, e.g., using only the selected text that is relevant to message 615. In another embodiment, the system is capable of generating co-reference 645 using the correlated message where the entire text is provided with the relevant text highlighted therein.

The system further may provide metadata such as the sender of the correlated message selected for co-reference generation, the date and/or time the selected correlated message was received, or other identifying information. The metadata may be part of, or included within, co-reference 645. In another example, co-reference 645 may be an icon that, when selected, causes the system to display a pop-up window or other user interface element that provides any of the information previously described as part of, or within, co-reference 645.

The example embodiments described herein may be initiated using one or more different techniques as part of the messaging platform. In one example, the system is capable of capturing a message creation event indicating that a user is about to post the message. Responsive to the user posting the message, the system is capable of intercepting the posting event and the message. The system performs the co-reference processing described herein prior to actual posting of the message (e.g., prior to making the message available to the target). The system is also capable of performing one or more or all of the operations described herein as a user creates the message, e.g., concurrently with writing.

In another example, the system is capable of detecting an event that a message is created, e.g., posted. In that case, the system is capable of performing just-in-time co-reference processing for the message. The system can generate the co-reference and, in response to generating the co-reference, update the post of the message to include the co-reference.

In another example, the system is capable of performing the co-reference processing for messages after the fact. For instance, the system is capable of polling for new messages at specified time intervals, periodically, from time-to-time, or responsive to particular events. Responsive to determining that new messages exist since the last or prior polling, the system is capable of performing co-reference processing for the new messages. The system is capable of updating messages to include generated co-references as necessary.

In another embodiment, the co-reference may be directed to a particular target. For example, in cases where a user generates a message and a co-reference is provided with the message, the co-reference may be hidden from view for one or more users of the system and not hidden from one or more other (e.g., enumerated) users of the system. In this manner, the system selectively hides the co-reference based upon the target of the message and/or the user that is viewing the message. For example, User A may post a message and associated co-reference to a plurality of users including Users B and C. The system may allow User B to view only the message from User A while the system allows User C to view both the message and the associated co-reference.

In accordance with the inventive arrangements, a social networking system is capable of processing messages. The social networking system processes messages to identify those messages without context or a reference point. The system determines context and/or a reference point for the messages by locating correlated messages from a set of messages and generating a co-reference from selected ones and/or portions of selected ones of the correlated messages. The co-reference is provided with the message initially determined to lack context or a reference point thereby clarifying the communication.

In another embodiment, ambiguity resolution may be performed by a system to identify a reference. The system may receive a message, e.g., text, from a sender to a recipient or target in a social networking system, apply NLP to the text to identify an ambiguity, and responsive to detecting the ambiguity, perform an action utilizing information from other messages in the social networking system.

In one aspect, the action includes associating the message with a previously sent message. In another aspect, the action is presenting the sender with selectable options. For example, the system is capable of selecting the selectable options from a group consisting of phrase insertions, references, new entries, etc. In another example, the system determines the selectable options from communications based on social network relationship criteria. Examples of different social networking systems include The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the term "another" means at least a second or more.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "plurality" means two or more than two.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the terms "program code," "software," "application," and "executable code" mean any expression, in any language, code or notation, of a set of instructions intended to cause a data processing system to perform a particular function either directly or after either or both of the following: a) conversion to another language, code, or notation; b) reproduction in a different material form. Examples of program code may include, but are not limited to, a subroutine, a function, a procedure, an object method, an object implementation, an executable application, an applet, a servlet, source code, object code, a shared library/dynamic load library and/or other sequence of instructions designed for execution on a computer system.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of clarifying communications, comprising:
receiving, using a processor, a first message from a sending device directed to a user device;
determining, using the processor, a second message correlated with the first message;
generating, using the processor, a co-reference from the second message; and
providing, using the processor, the first message and the co-reference to the user device, wherein
the co-reference provides supplemental information about the first message that clarifies the first message.

2. The method of claim 1, wherein
the determining the second message is performed responsive to detecting an ambiguity in text of the first message using natural language processing.

3. The method of claim 1, wherein
the co-reference includes text from the second message.

4. The method of claim 3, wherein
the text from the second message is selected as a subset of text of the second message.

5. The method of claim 1, wherein
the determining the second message comprises:
determining a plurality of messages correlated with the first message;
providing the plurality of messages to the sending device as selectable options; and
designating a particular message from the plurality of messages as the second message responsive to a selection of the particular message.

6. The method of claim 1, wherein
the second message is determined from a plurality of messages of users of a social networking system based upon relationship of the users of the social networking system to a sending user or a target of the first message.

7. The method of claim 1, wherein
the determining of the second message is performed responsive to determining that the first message meets co-reference criteria.

8. A system, comprising:
a processor programmed to initiate executable operations for clarifying communications comprising:
receiving a first message from a sending device directed to a user device;
determining a second message correlated with the first message;
generating a co-reference from the second message; and
providing the first message and the co-reference to the user device, wherein
the co-reference provides supplemental information about the first message that clarifies the first message.

9. The system of claim 8, wherein
the determining the second message is performed responsive to detecting an ambiguity in text of the first message using natural language processing.

10. The system of claim 8, wherein
the co-reference includes text from the second message.

11. The system of claim 10, wherein
the text from the second message is selected as a subset of text of the second message.

12. The system of claim 8, wherein
the determining the second message comprises:
determining a plurality of messages correlated with the first message;
providing the plurality of messages to the sending device as selectable options; and
designating a particular message from the plurality of messages as the second message responsive to a selection of the particular message.

13. The system of claim 8, wherein
the second message is determined from a plurality of messages of users of a social networking system based upon relationship of the users of the social networking system to a sending user or a target of the first message.

14. The system of claim 8, wherein
the determining of the second message is performed responsive to determining that the first message meets co-reference criteria.

15. A computer program product, comprising:
a computer readable storage medium having program code stored thereon,
the program code, which when exuted by a computer hardware system, causes the computer hardware system to perform:
receiving a first message from a sending device directed to a user device;
determining a second message correlated with the first message;
generating a co-reference from the second message; and
providing the first message and the co-reference to the user device, wherein the co-reference provides supplemental information about the first message that clarifies the first message.

16. The computer program product of claim 15, wherein the determining the second message is performed responsive to detecting an ambiguity in text of the first message using natural language processing.

17. The computer program product of claim 15, wherein the co-reference includes text from the second message.

18. The computer program product of claim 17, wherein the text from the second message is selected as a subset of text of the second message.

19. The computer program product of claim 15, wherein the determining the second message comprises:
   determining a plurality of messages correlated with the first message;
   providing the plurality of messages to the sending device as selectable options; and
   designating a particular message from the plurality of messages as the second message responsive to a selection of the particular message.

20. The computer program product of claim 15, wherein the second message is determined from a plurality of messages of users of a social networking system based upon relationship of the users of the social networking system to a sending user or a target of the first message.

* * * * *